US006776917B2

(12) United States Patent
Hsiao et al.

(10) Patent No.: US 6,776,917 B2
(45) Date of Patent: Aug. 17, 2004

(54) CHEMICAL MECHANICAL POLISHING THICKNESS CONTROL IN MAGNETIC HEAD FABRICATION

(75) Inventors: Richard Hsiao, San Jose, CA (US); Son Van Nguyen, Los Gatos, CA (US); Thao Pham, San Jose, CA (US); Eugene Zhao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 09/754,235

(22) Filed: Jan. 3, 2001

(65) Prior Publication Data

US 2002/0084243 A1 Jul. 4, 2002

(51) Int. Cl.[7] .............................. B44C 1/22; H01L 21/00
(52) U.S. Cl. .............................. 216/88; 216/89; 216/94; 451/29; 438/691; 438/692
(58) Field of Search .............................. 216/88, 89, 94; 451/29; 438/691, 692

(56) References Cited

U.S. PATENT DOCUMENTS

| 5,246,884 A | * | 9/1993 | Jaso et al. ................... 438/693 |
| 5,272,117 A | * | 12/1993 | Roth et al. .................... 216/38 |
| 5,609,948 A | | 3/1997 | David et al. ................. 428/216 |
| 5,663,856 A | | 9/1997 | Packard ....................... 360/122 |
| 5,681,426 A | | 10/1997 | Schultz et al. ............. 156/654.1 |
| 5,707,409 A | * | 1/1998 | Martin et al. ................ 427/380 |
| 5,798,302 A | * | 8/1998 | Hudson et al. .............. 438/682 |
| 5,837,612 A | | 11/1998 | Ajuria et al. ................ 438/697 |
| 5,891,513 A | | 4/1999 | Dubin et al. .................. 427/98 |
| 5,896,252 A | | 4/1999 | Kanai .......................... 360/113 |
| 5,916,423 A | | 6/1999 | Westwood ............. 204/192.32 |
| 6,086,777 A | * | 7/2000 | Cheng et al. .................. 216/67 |
| 6,110,396 A | * | 8/2000 | Ronay .......................... 216/100 |
| 6,153,116 A | * | 11/2000 | Yang et al. .................... 216/84 |
| 6,417,109 B1 | * | 7/2002 | Jordan et al. ................ 438/692 |

* cited by examiner

Primary Examiner—Nadine G. Norton
Assistant Examiner—Shamin Ahmed
(74) Attorney, Agent, or Firm—Robert O. Guillot; IPLO Intellectual Property Law Offices

(57) ABSTRACT

The method for controlling the depth of polishing during a CMP process involves the deposition of a polishing stop layer at an appropriate point in the device fabrication process. The stop layer is comprised of a substance that is substantially more resistant to polishing with a particular polishing slurry that is utilized in the CMP process than a polishable material layer. Preferred stop layer materials of the present invention are tantalum and diamond-like carbon (DLC), and the polishable layer may consist of alumina. In one embodiment of the present invention the stop layer is deposited directly onto the top surface of components to be protected during the CMP process. A polishable layer is thereafter deposited upon the stop layer, and the CMP polishing step removes the polishable material layer down to the portions of the stop layer that are deposited upon the top surfaces of the components. The stop layer is thereafter removed from the top surface of the components. In this embodiment, the fabricated height of the components is preserved.

34 Claims, 2 Drawing Sheets

CHEMICAL MECHANICAL POLISHING THICKNESS CONTROL IN MAGNETIC HEAD FABRICATION

BACKGROUND OF THE INVENTION

1. Field of the Invention

The present invention relates generally to chemical mechanical polishing (CMP) fabrication techniques, and more particularly to the use of a polishing stop layer to achieve CMP thickness variation control, with particular application to the fabrication of magnetic heads.

2. Description of the Prior Art

Various types of thin film devices, such as magnetic heads for hard disk drives, are fabricated in large quantities on a single substrate surface. Following fabrication the substrate is sliced, or diced to provide a large quantity of discrete devices for later incorporation into various component assemblies. In the thin film fabrication process various features of the devices are fabricated utilizing precise thin film deposition and/or removal techniques, and it is often necessary that the thin film layers be deposited on a flat surface. To achieve such a flat surface during a fabrication process, a chemical mechanical polishing (CMP) process step is typically undertaken. Such a typical CMP step involves the use of a wet slurry that is disposed on a large, flat, moving polishing surface or table. Slurry chemistries can be quite complicated, and generally include a water base with additives to provide a basic or acidic pH depending upon the chemistry of the thin films formed on the substrate, together with an abrasive material. Substrate surfaces to be polished are placed upon the slurry coated flat polishing table and the movement of the table and slurry acts to polish the substrate surface.

To achieve a good product yield from a substrate, it is desirable to have good process control of the CMP step. Problems exist in the prior art CMP process control in that it is often the case that the polishing rate varies across the surface of the substrate, typically polishing is greater towards the edges of the substrate than at the center. Additionally, variations in the chemical composition and/or physical distribution of the slurry across the polishing table surface can result in uneven polishing of the substrate. It is also important to control the polishing depth, that is, the thickness of material that is removed from the substrate surface. Because material removal rates can vary across the substrate, polishing substrates for a particular time period can result in unequal CMP material removal from different substrate areas. It is therefore desirable to have a means for determining when the CMP polishing step has proceeded to a predetermined depth and to achieve uniform polishing across a substrate surface.

The present invention solves these CMP processing problems by the inclusion of a thin film polishing stop layer in the substrate fabrication process. With such a layer it then becomes possible to achieve a more even substrate polishing across the surface of the substrate, as well as to determine when the CMP polishing step has removed the appropriate thickness of material from the substrate.

SUMMARY OF THE INVENTION

The method for controlling the depth of polishing during a CMP process involves the deposition of a polishing stop layer at an appropriate point in the device fabrication process. The stop layer is comprised of a substance that is substantially more resistant to polishing with a particular polishing slurry that is utilized in the CMP process than a polishable material layer. Preferred stop layer materials of the present invention are tantalum and diamond-like-carbon (DLC), and the polishable layer may consist of alumina. In one embodiment of the present invention the stop layer is deposited directly onto the top surface of components to be protected during the CMP process. A polishable layer is thereafter deposited upon the stop layer, and the CMP polishing step removes the polishable material layer down to the portions of the stop layer that are deposited upon the top surfaces of the components. The stop layer is thereafter removed from the top surface of the components. In this embodiment, the fabricated height of the components is preserved.

In another embodiment of the present invention a first material layer is deposited following the fabrication of upwardly projecting components upon the substrate surface. A polishing stop layer is thereafter deposited upon the first material layer, and a polishable layer is then deposited upon the stop layer. In a subsequent CMP polishing step the substrate surface is polished down to height of the stop layer that is deposited upon the first material layer. Thereafter, the stop layer is removed. In this embodiment the height of the components is determined by the thickness of the first material layer. In the embodiments of the present invention the CMP end point is determinable by monitoring the electrical current of the polishing motor that is utilized in the CMP process.

In the CMP polishing method described above, the "components" can be magnetic pole pieces or induction coil turns of a magnetic head, or other components of recording heads, semiconductor devices or micro electrical mechanical systems (MEMS).

It is an advantage of the method for determining a CMP polishing end point of the present invention that uniform polishing of components across the surface of a substrate is obtained.

It is another advantage of the method for determining a CMP polishing end point of the present invention that a more uniform height for upwardly projecting components can be obtained during a CMP polishing process.

It is a further advantage of the method for determining a CMP polishing end point of the present invention that a CMP polishing end point can be more easily determined.

It is yet another advantage of the method for determining a CMP polishing end point of the present invention that component parts of magnetic heads that undergo a CMP process step can be more reliably fabricated.

It is yet a further advantage of the method for determining a CMP polishing end point of the present invention that the product yield of a plurality of components that are fabricated on a substrate which undergoes a CMP process step can be increased.

These and other features and advantages of the present invention will become well understood by those skilled in the art upon reading the following detailed description which makes reference to the several figures of the drawings.

IN THE DRAWINGS

DETAILED DESCRIPTION OF THE PREFERRED EMBODIMENTS

Figure 1:
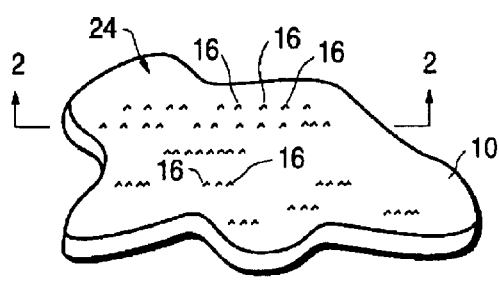
FIG. 1 is a perspective view of a portion of a substrate surface during a fabrication process having a plurality of devices being fabricated thereon.

A portion of a surface 24 of a substrate 10 having many devices 16, such as magnetic heads, being fabricated thereon is shown in perspective view in FIG. 1. As is well known, a chemical mechanical polishing (CMP) process step is typically conducted to planarize the substrate surface one or more times during a magnetic head fabrication process, and the present invention relates to methods for controlling the material removal from the substrate during a CMP process step, as is next described in detail and depicted in FIGS. 2–13.

Figure 2:
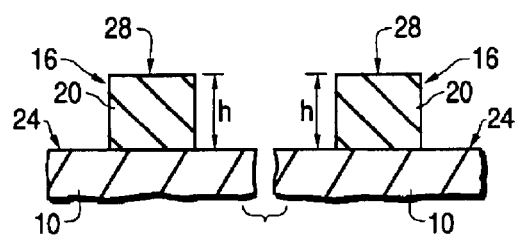
FIG. 2 is a side cross-sectional view taken along lines 2—2 of FIG. 1, diagrammatically depicting two such devices on the substrate surface of FIG. 1 during fabrication, which serves an appropriate starting point to describe the present invention.

FIG. 2 is a side cross-sectional view taken along lines 2—2 of FIG. 1 that depicts two component features 20 of devices 16 that project upwardly from a surface 24 of a substrate 10. The component features 20 have a top surface 28 and are meant to generally include various different components of a device 16 that is being fabricated on the substrate 10, such as magnetic pole pieces, induction coil pieces, electrical interconnect pieces and the like, as well as other recording head components, semiconductor devices or micro electrical mechanical systems (MEMS).

Figure 3:
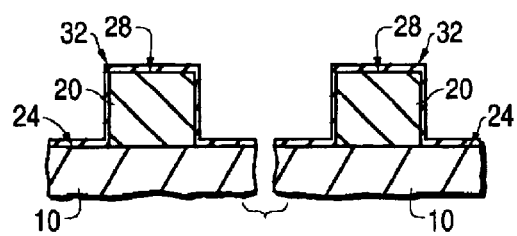

In a first embodiment of the present invention, depicted in FIGS. 3–6, it is the goal of the CMP process step to maintain the height h of the components 20 during a CMP process. As depicted in FIG. 3, the first step of the present invention is to deposit a protective CMP stop layer 32 upon the substrate surface 24 to particularly cover the top surface 28 of each component 20 on the substrate 10. Key features of the protective layer 32 are that it is composed of a substance that is highly resistant to the CMP polishing that will be conducted, and that it not involve chemistries that may contaminate or harm the device being fabricated. In the preferred embodiment, a protective layer 32 composed of tantalum or of diamond-like-carbon (DLC) has proven to be effective. The tantalum or DLC layer is preferably applied utilizing well known sputtering techniques, and a protective layer 32 having a thickness of 200 to 500 Å is generally suitable. Where the layer 32 is composed of tantalum, a thickness approaching 500 Å is preferred, whereas when the layer 32 is composed of DLC, a thickness of approximately 200 Å is preferred. Because the tantalum or DLC layer on top of the component is subsequently removed, a thinner yet operable protective layer 32 is preferred.

Figure 4:
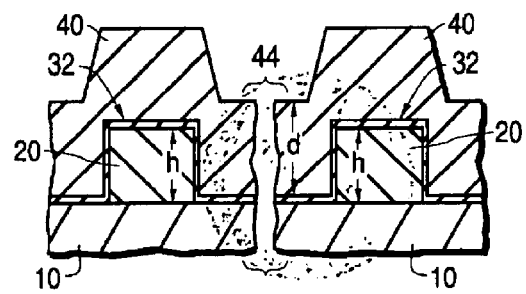
FIGS. 3–6 depict further fabrication steps in a first embodiment of the present invention.
Figure 5:
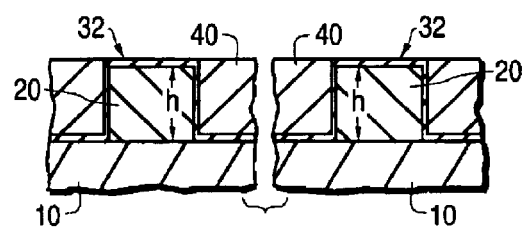
Figure 6:
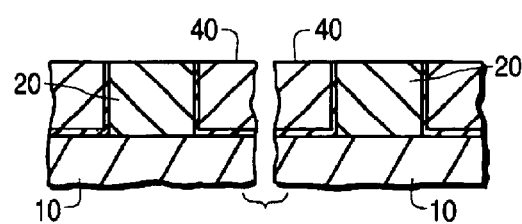

Following the deposition of the protective layer 32, a polishable fill layer 40, composed of a material such as alumina, is deposited across the surface of the substrate. As depicted in FIG. 4, the alumina layer 40 is deposited to a depth d that is greater than the height h of the components 20, such that the top surface 44 of the layer 40 is above the height of the protective layer 32 on top of the component 20. Thereafter, as depicted in FIG. 5, a standard CMP process is undertaken to remove the excess alumina that is deposited above the height of the protective layer 32. The slurry of the CMP process is selected to have a strong polishing selectivity for alumina over the protective layer material. As is seen in FIG. 5, the protective layer 32 on top of the components 20 serves as a CMP process stopping layer. That is, due to the resistance of the layer 32 to the CMP polishing, the CMP polishing process is stopped by the layer 32 and the height h of the features 20 is protected from excessive polishing that might otherwise reduce the height h of the components 20. The polishing end point can be determined by monitoring the polishing motor current, which will decrease when the relatively hard protective layer 32 is reached. Thus, where uneven CMP polishing typically occurs in the prior art across the surface of the wafer, and results in polishing down some components 20 in excessively polished areas of the substrate surface, the protective polishing stop layer 32 preserves the height h of all of the components 20 across the substrate surface. Lastly, as depicted in FIG. 6, the portion of the protective layer 32 on top of the components 20 is removed. Where the protective layer 32 is composed of tantalum, an ion etching process with argon or a wet etching process utilizing appropriate chemistries can be utilized to remove it. Alternatively a CMP process using a slurry that has a 1:1 selectivity for alumina/Ta can be used to remove the Ta stop layer. Where the layer 32 is composed of DLC, a sputter etching process or a reactive ion etching process with oxygen reactive species may be utilized to remove it, as well as a plasma ashing process using oxygen.

Figure 7:
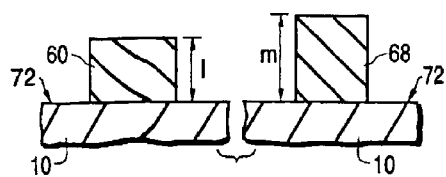
FIGS. 7–13 are side cross-sectional views depicting fabrication steps of a second embodiment of the present invention.
Figure 10:
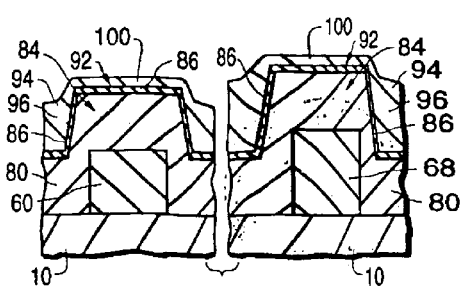
Figure 8:
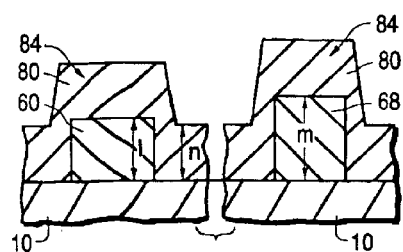

An alternative embodiment of the present invention is depicted in FIGS. 7–13, and is utilized where it is desired to equalize the height of components fabricated upon a substrate surface. As is depicted in FIG. 7, two components 60 and 68 have been fabricated upon a surface 72 of a substrate 10. It is significant to note that the height l of component 60 is less than the height m of component 68. Thereafter, as depicted in FIG. 8, a fill layer 80, such as alumina, is deposited upon the surface of the substrate. It is significant that the thickness n of the alumina layer 80 is less than the height l of the component 60, and it is noted that material from the layer 80 forms a deposit 84 on top of the components 60 and 68.

Figure 11:
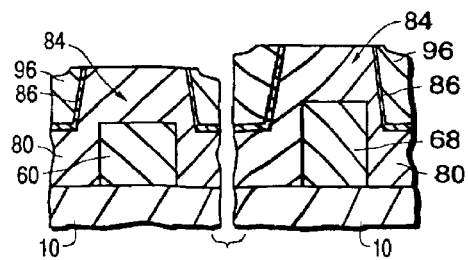
Figure 12:
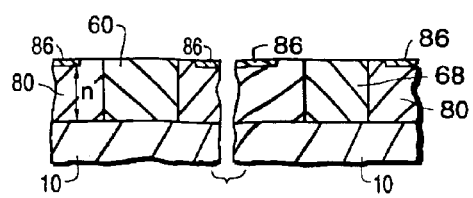
Figure 9:
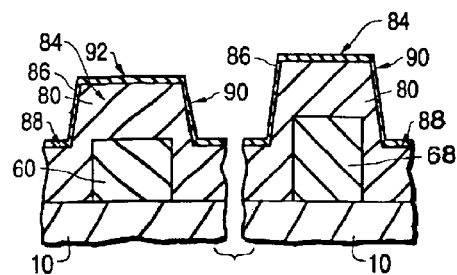
Figure 13:
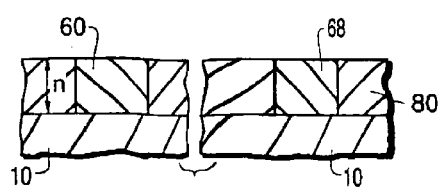

Thereafter, as depicted in FIG. 9, a CMP stop layer 86 is deposited on top of the layer 80. As discussed hereabove, the CMP layer 86 is preferably composed of tantalum or DLC, and where tantalum is utilized the preferred layer thickness is approximately 500 Å, while when DLC is utilized the preferred layer thickness is approximately 200 Å. As seen in FIG. 9, the CMP stop layer 86 tends to be thicker on the horizontal surfaces 88 and thinner on the more vertical surfaces 90, and a top portion 92 of the stop layer 86 is deposited upon the projecting deposits 84. As is next depicted in FIG. 10, a polishable layer 94 is next fabricated on top of the stop layer 86. The layer 94 is preferably composed of a spin-on resist, which typically flows to create a relatively thick portion 96 in valley areas and a relatively thin portion 100 on top of the projecting surfaces 92 of the CMP stop layer 86. Thereafter, as depicted in FIG. 11, an RIE process is conducted to remove the thin portions 100 of the layer 94 as well as the top portion 92 of the CMP stop layer 86 that was deposited on top of the deposits 84 above the components 60 and 68. Where tantalum is utilized as the stop layer 86, an ion etching removal process utilizing argon or $CF_4$ is conducted, whereas an oxygen species enhanced RIE removal process is used for a CMP stop layer composed of DLC. Other appropriate stop layer removal processes, as identified above, may also be used. After the top portion 92 of the CMP stop layer 86 has been removed, a CMP polishing step is conducted. As depicted in FIG. 12, the CMP step proceeds until the horizontal portions of the CMP stop layer 86 have been reached. The end point can be detected by monitoring the polishing motor current. At this point, it is significant to note that each of the components 60 and 68 has been reduced to the same height, that height being the thickness n of the alumina layer 80, plus the thickness of the CMP stop layer 86. In a last process step shown in FIG. 13, the remaining CMP stop layer 86 is removed. As indicated above, where the layer 86 is composed of tantalum, an ion etching process utilizing argon or $CF_4$ is utilized. Where the layer 86 is composed of DLC, an RIE process utilizing oxygen species is conducted, or, alternatively, a plasma ashing process utilizing oxygen may also be used. Other stop layer removal processes, identified above, may alternatively be used.

The present invention is not dependent upon the various standard CMP polishing compound chemistries, so long as the CMP stop layer 32 and 86 is substantially resistant to CMP polishing by the slurry. Tantalum and DLC have been specifically identified in the present invention because they are both significantly resistant to the standard CMP chemistries and therefore form good CMP stop layers. Additionally, with regard to DLC, it is a compound that has been commonly utilized in many fabrication processes, such that its use as a CMP stop layer is predictable in terms of its effects on the chemistries and the electrical and magnetic properties of the devices.

While the invention has been shown and described with regard to certain preferred embodiments, the true spirit and scope of the present invention is to be defined by the claims which follow. It is therefore to be understood that those skilled in the art may no doubt devise various alterations and modifications in form and detail which nevertheless include the spirit and scope of the present invention. It is therefore intended that the following claims cover all such alterations and modifications.

What is claimed is:

1. A method for controlling the end point of the chemical mechanical polishing (CMP) of a surface having a plurality of projecting components fabricated thereon, comprising the steps of:
    fabricating a plurality of upwardly projecting components upon a substrate surface;
    fabricating a first material layer that is deposited in part upon a top surface of said projecting components and in part upon a top surface of said substrate;
    fabricating a CMP polishing end stop layer above said first material layer;
    fabricating a polishable layer above said polishing end stop layer;
    conducting a CMP polishing step utilizing a polishing slurry that selectively removes said polishing layer as compared to said polishing end stop layer;
    removing portions of said polishing end stop layer subsequent to said polishing step.

2. A method for controlling CMP polishing as described in claim 1 wherein said stop layer is composed of a substance that is significantly more resistant to polishing removal by said slurry than said polishable layer.

3. A method for controlling CMP polishing as described in claim 2 wherein said stop layer is comprised of a substance selected from the group consisting of tantalum and diamond-like-carbon (DLC).

4. A method for controlling CMP polishing as described in claim 3 wherein said stop layer is formed with a thickness of from 200 to 500 Å.

5. A method for controlling CMP polishing as described in claim 3 wherein said stop layer is comprised of tantalum and is formed with a thickness of approximately 500 Å.

6. A method for controlling CMP polishing as described in claim 3 wherein said stop layer is comprised of DLC and is formed with a thickness of approximately 200 Å.

7. A method for controlling CMP polishing as described in claim 2 wherein said stop layer is removed utilizing an ion etching process.

8. A method for controlling CMP polishing as described in claim 2 wherein said stop layer is comprised of tantalum and wherein said stop layer is removed utilizing an argon ion etching process.

9. A method for controlling CMP polishing as described in claim 2 wherein said stop layer is removed utilizing a CMP process.

10. A method for controlling CMP polishing as described in claim 2 wherein said stop layer is comprised of DLC and wherein said stop layer is removed through use of a reactive ion etch process utilizing oxygen reactive species.

11. A method for controlling CMP polishing as described in claim 2 wherein said stop layer is comprised of DLC and wherein said stop layer is removed by use of a plasma ashing process utilizing oxygen.

12. A method for controlling CMP polishing as described in claim 2 wherein an end stopping point of said CMP process is determined by monitoring a polishing motor current during said CMP polishing step.

13. A method for controlling the end point of a chemical mechanical polishing (CMP) process of a surface having a plurality of upwardly projected components fabricated thereon, comprising the steps of:
    depositing a polishing stop layer upon said components, with portions of said stop layer being deposited upon the top surface portions of said components;
    depositing a polishable layer upon said stop layer, wherein said polishable layer is deposited to a depth that is greater than a projecting height of said components;
    conducting a CMP polishing step utilizing a polishing slurry that selectively removes said polishing layer as compared to said stop layer; wherein said CMP polishing step is conducted down to said portions of said stop layer that cover said top surface portions of said components;
    removing said portions of said stop layer that cover said top surface portions of said components.

14. A method for controlling CMP polishing as described in claim 13 wherein said stop layer is comprised of a substance selected from the group consisting of tantalum and diamond-like-carbon (DLC).

15. A method for controlling CMP polishing as described in claim 14 wherein said stop layer is formed with a thickness of from 200 to 500 Å.

16. A method for controlling CMP polishing as described in claim 14 wherein said stop layer is comprised of tantalum and is formed with a thickness of approximately 500 Å.

17. A method for controlling CMP polishing as described in claim 14 wherein said stop layer is comprised of DLC and is formed with a thickness of approximately 200 Å.

18. A method for controlling CMP polishing as described in claim 14 wherein said stop layer is removed utilizing an ion etching process.

19. A method for controlling CMP polishing as described in claim 13 wherein said stop layer is comprised of tantalum and wherein said stop layer is removed utilizing an argon ion etching process.

20. A method for controlling CMP polishing as described in claim 13 wherein said stop layer is removed utilizing a CMP process.

21. A method for controlling CMP polishing as described in claim 14 wherein said stop layer is comprised of DLC and wherein said stop layer is removed through use of a reactive ion etch process utilizing oxygen reactive species.

22. A method for controlling CMP polishing as described in claim 14 wherein said stop layer is comprised of DLC and wherein said stop layer is removed by use of a plasma ashing process utilizing oxygen.

23. A method for controlling CMP polishing as described in claim 13 wherein an end stopping point of said CMP process is determined by monitoring a polishing motor current during said CMP polishing step.

24. A method for controlling the end point of a chemical mechanical polishing (CMP) process of a substrate surface having a plurality of upwardly projecting components fabricated thereon, comprising the steps of:

depositing a first layer of material upon said substrate, wherein a projecting portion of said first layer of material is deposited on top of said components, and wherein said first layer is deposited to a depth that is less than a projecting height of said components;

depositing a polishing stop layer upon said first layer of material, with a portion of said stop layer being deposited on top of said projecting portions of said first layer;

depositing a polishable layer on top of said stop layer, wherein portions of said polishable layer are deposited on top of said portion of said stop layer that are deposited on top of said projecting portions of said first layer;

removing portions of said polishable layer and said stop layer that are deposited on top of said projecting portions of said first layer;

conducting a CMP polishing step utilizing a polishing slurry that selectively removes said polishable layer as compared to said stop layer;

removing said stop layer from said first layer.

25. A method for controlling CMP polishing as described in claim 24 wherein said stop layer is comprised of a substance selected from the group consisting of tantalum and diamond like carbon (DLC).

26. A method for controlling CMP polishing as described in claim 24 wherein said stop layer is formed with a thickness of from 200 to 500 Å.

27. A method for controlling CMP polishing as described in claim 24 wherein said stop layer is comprised of tantalum and is formed with a thickness of approximately 500 Å.

28. A method for controlling CMP polishing as described in claim 25, wherein said stop layer is comprised of DLC and is formed with a thickness of approximately 200 Å.

29. A method for controlling CMP polishing as described in claim 24, wherein said stop layer is removed utilizing an ion etching process.

30. A method for controlling CMP polishing as described in claim 24 wherein said stop layer is comprised of tantalum and wherein said stop layer is removed utilizing an argon ion etching process.

31. A method for controlling CMP polishing as described in claim 24 wherein said stop layer is removed utilizing a CMP process.

32. A method for controlling CMP polishing as described in claim 25 wherein said stop layer is comprised of DLC and wherein said stop layer is removed through use of a reactive ion etch process utilizing oxygen reactive species.

33. A method for controlling CMP polishing as described in claim 25 wherein said stop layer is comprised of DLC and wherein said stop layer is removed by use of a plasma ashing process utilizing oxygen.

34. A method for controlling CMP polishing as described in claim 24 wherein an end stopping point of said CMP process is determined by monitoring a polishing motor current during said CMP polishing step.

* * * * *